(12) United States Patent
Ijichi

(10) Patent No.: US 9,041,368 B2
(45) Date of Patent: May 26, 2015

(54) POWER SUPPLY DEVICE

(71) Applicant: OLYMPUS CORPORATION, Tokyo (JP)

(72) Inventor: Toshiro Ijichi, Hachioji (JP)

(73) Assignee: OLYMPUS CORPORATION, Tokyo (JP)

(*) Notice: Subject to any disclaimer, the term of this patent is extended or adjusted under 35 U.S.C. 154(b) by 25 days.

(21) Appl. No.: 13/932,474

(22) Filed: Jul. 1, 2013

(65) Prior Publication Data

US 2013/0286690 A1    Oct. 31, 2013

Related U.S. Application Data

(63) Continuation of application No. PCT/JP2011/078574, filed on Dec. 9, 2011.

(30) Foreign Application Priority Data

Jan. 20, 2011 (JP) ................................. 2011-010129

(51) Int. Cl.
| | | |
|---|---|---|
| G05F 1/00 | (2006.01) | |
| H02J 1/10 | (2006.01) | |
| H02M 7/217 | (2006.01) | |
| H02M 3/28 | (2006.01) | |
| H02M 1/42 | (2007.01) | |

(Continued)

(52) U.S. Cl.
CPC ............... *H02M 7/217* (2013.01); *H02M 3/28* (2013.01); *H02M 2001/007* (2013.01);
(Continued)

(58) Field of Classification Search
USPC ............ 323/270, 274; 361/18, 88, 91.5–91.7; 363/19, 56.12, 65, 73, 123, 124, 131, 363/135
See application file for complete search history.

(56) References Cited

U.S. PATENT DOCUMENTS 3,818,273 A * 6/1974 Nakashima et al. ............ 361/59
5,886,885 A * 3/1999 Fujie ................................ 363/49

(Continued)

FOREIGN PATENT DOCUMENTS

| JP | 2003-169479 A | 6/2003 |
|---|---|---|
| JP | 2003-319655 A | 11/2003 |

(Continued)

OTHER PUBLICATIONS

International Search Report dated Mar. 13, 2012 issued in PCT/JP2011/078574.

*Primary Examiner* — Adolf Berhane
*Assistant Examiner* — Gary Nash
(74) *Attorney, Agent, or Firm* — Scully, Scott, Murphy & Presser, P.C.

(57) ABSTRACT

A power supply device includes a first converter which converts an input voltage to a first voltage, a second converter which converts the first voltage from the first converter to a second voltage, a voltage comparison section which compares the first voltage outputted from the first converter with a predetermined reference voltage, a voltage comparison result output section which outputs a first signal until the first voltage is determined to be higher than the predetermined reference voltage by the voltage comparison section and retains a second signal as an output after the first voltage is determined to be higher than the predetermined reference voltage, and a converter control section which controls the second converter to stop when the first signal is outputted from the voltage comparison result output section and controls the second converter to operate when the second signal is outputted from the voltage comparison result output section.

6 Claims, 6 Drawing Sheets

(51) Int. Cl.
*H02M 1/00* (2006.01)
*H02M 1/36* (2007.01)

(52) U.S. Cl.
CPC ............. *H02M 1/36* (2013.01); *H02M 1/4225*
(2013.01); *H02M 2001/0035* (2013.01); *Y02B*
*70/126* (2013.01); *Y02B 70/16* (2013.01)

(56) References Cited

U.S. PATENT DOCUMENTS

| | | | |
|---|---|---|---|
| 6,169,391 B1* | 1/2001 | Lei | 323/266 |
| 7,715,216 B2* | 5/2010 | Liu et al. | 363/89 |
| 2004/0218410 A1* | 11/2004 | Yamada et al. | 363/125 |
| 2005/0088862 A1 | 4/2005 | Simada et al. | |
| 2009/0174386 A1* | 7/2009 | Popescu et al. | 323/303 |
| 2010/0127673 A1* | 5/2010 | Iino et al. | 323/271 |

FOREIGN PATENT DOCUMENTS

| | | |
|---|---|---|
| JP | 2004-096869 A | 3/2004 |
| JP | 2006-333634 A | 12/2006 |
| JP | 4013898 B2 | 11/2007 |
| WO | WO 03/049271 A1 | 6/2003 |
| WO | WO 03/067744 A1 | 8/2003 |

* cited by examiner

POWER SUPPLY DEVICE

CROSS REFERENCE TO RELATED APPLICATIONS

This application is a continuation application of PCT/JP2011/078574 filed on Dec. 9, 2011 and claims benefit of Japanese Application No. 2011-010129 filed in Japan on Jan. 20, 2011, the entire contents of which are incorporated herein by this reference.

BACKGROUND OF THE INVENTION

1. Field of the Invention

The present invention relates to a power supply device which can maintain a power output for a fixed time period even after a power input is shut off.

2. Description of the Related Art

Among configurations of general switching power supplies, a two-converter type configuration which includes a PFC (power factor controller) in an input stage and a DC-DC converter connected to the PFC in a stage subsequent to the input stage and obtains a DC output voltage is currently in the mainstream. The two converters are activated and stopped independently of each other.

SUMMARY OF THE INVENTION

A power supply device according to the present invention includes a first converter which converts an inputted voltage to a first voltage and outputs the first voltage, a second converter which converts the first voltage outputted from the first converter to a second voltage and outputs the second voltage, a voltage comparison section which compares the first voltage outputted from the first converter with a predetermined reference voltage, a voltage comparison result output section which outputs a first signal until the first voltage is determined to be higher than the predetermined reference voltage by the voltage comparison section and retains a second signal as an output after the first voltage is determined to be higher than the predetermined reference voltage, and a converter control section which controls the second converter to stop when the first signal is outputted from the voltage comparison result output section and controls the second converter to operate when the second signal is outputted from the voltage comparison result output section.

DETAILED DESCRIPTION OF THE PREFERRED EMBODIMENTS

Embodiments of the present invention will be described below in detail with reference to the drawings.

First Embodiment

Figure 1:
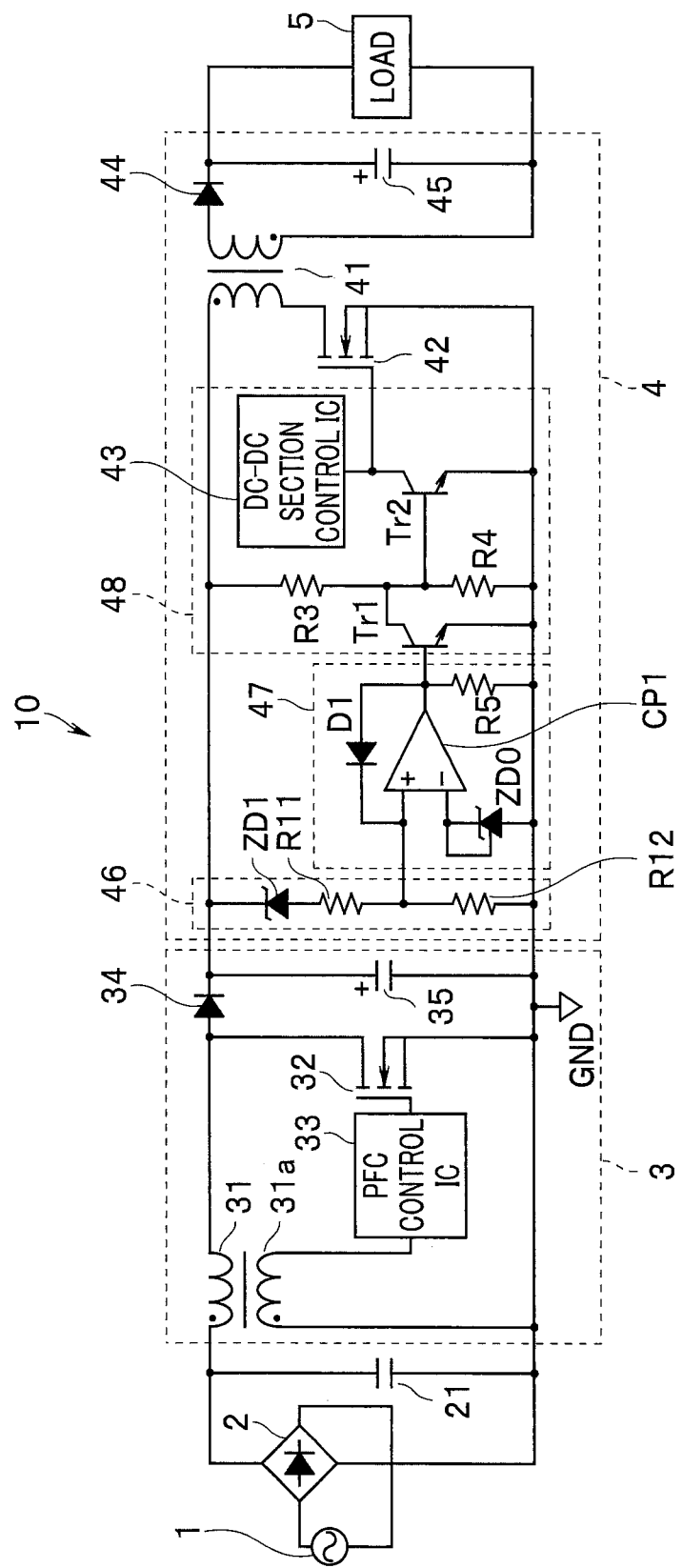
FIG. 1 is a circuit diagram showing a configuration of a power supply device according to a first embodiment of the present invention.

FIG. 1 shows a configuration of a power supply device according to a first embodiment of the present invention.

Referring to FIG. 1, a power supply device 10 has a commercial AC power supply (hereinafter referred to as an AC power supply) 1, a full-wave rectifier circuit 2 such as a diode bridge, a capacitor 21, a PFC 3 as a first converter, a DC-DC converter 4 as a second converter, and a load circuit 5 such as a processor.

Such a two-converter type power supply device constitutes a switching power supply device having a PFC and a DC-DC converter.

The PFC 3 is a non-insulated boost chopper type switching power supply and is used for power factor improvement.

The PFC 3 converts a voltage inputted from the full-wave rectifier circuit 2 and capacitor 21 to a first voltage and outputs the first voltage.

The PFC 3 has a boosting choke coil 31, an auxiliary winding 31a for a boosting choke coil, an FET 32 as a switching element, a PFC control IC 33, a commutating diode 34, and a smoothing capacitor (hereinafter referred to as an output capacitor) 35 for output.

The PFC control IC 33 supplies a switching pulse to a gate of the FET 32 for switching and performs control for boosting an AC input voltage from the AC power supply 1 to a voltage (set voltage) higher than a maximum crest value for the AC input voltage and generating a DC output voltage in the output capacitor 35.

When the FET 32 is on, energy is accumulated in the boosting choke coil 31. On the other hand, when the FET 32 is off, the commutating diode 34 is conducting and releases the energy accumulated in the coil 31 toward the output capacitor 35. At the time, since a voltage generated in the boosting choke coil 31 is added in series to an output voltage of the capacitor 21 after full-wave rectification (i.e., an input voltage of the first converter), an output voltage of the output capacitor 35 is higher than the input voltage.

The DC-DC converter 4 converts the first voltage outputted from the PFC 3 to a second voltage and outputs the second voltage.

The DC-DC converter 4 has a transformer 41 which outputs a secondary voltage obtained through voltage conversion to a secondary side according to switching operation on a primary side, an FET 42 as a switching element which is provided on the primary side of the transformer 41, a voltage comparison section 46, a voltage comparison result output section 47, a converter control section 48 which includes a DC-DC section control IC 43, a diode 44 for secondary-side rectification, and a smoothing capacitor 45 for secondary-side output.

The voltage comparison section 46 compares a voltage outputted from the PFC 3 as the first converter with a predetermined reference voltage (Zener voltage) based on a Zener diode ZD1.

The voltage comparison section 46 is constructed by connecting in series the Zener diode ZD1 that senses operation (on state) of the DC-DC converter 4 and resistors R11 and R12. A series circuit made up of the Zener diode ZD1 and the resistors R11 and R12 is connected in parallel to the output capacitor 35 on a side of the PFC.

The voltage comparison result output section 47 outputs the first signal (at, for example, L level) until the first voltage outputted from the PFC 3 is determined to be higher than the predetermined reference voltage by the voltage comparison section 46 and retains the second signal (at, for example, H level) as an output after the first voltage is determined to be higher than the predetermined reference voltage.

The voltage comparison result output section 47 inputs a voltage obtained from a connection point of the resistors R11 and R12 of the voltage comparison section 46 to a + input end of a comparator CP1, and a − input end of the comparator CP1 is connected to a ground GND via a Zener diode ZD0 which provides a reference voltage. An output end of the comparator CP1 is connected to the ground GND via a resistor R5. A comparison output from the output end is inputted to a base of a transistor Tr1 of the converter control section 48 in a next stage and is also fed back to the + input end of the comparator CP1 via a diode D1. With the diode D1 for feedback, the comparator CP1 has a latch function.

In the converter control section 48, a series circuit made up of resistors R3 and R4 is connected in parallel to the output capacitor 35 of the PFC 3. The output end of the comparator CP1 is connected to the base of the transistor Tr1, an emitter of the transistor Tr1 is connected to the ground (reference potential point) GND, and a collector of the transistor Tr1 is connected to a connection point of the resistors R3 and R4. A base of a transistor Tr2 is also connected to the connection point of the resistors R3 and R4, and an emitter of the transistor Tr2 is connected to the ground GND. A collector of the transistor Tr2 is connected to an output point of the DC-DC section control IC 43 and is connected to a gate of the FET 42 for switching.

With the above-described configuration, it is possible to achieve a function of sensing operation of the PFC with the reference voltage based on the Zener diode ZD1 and activating the DC-DC converter by using the voltage comparison section 46 when a power switch (not shown) is turned on and achieve a function of maintaining output for a fixed time period by using the voltage comparison result output section 47 even after the power switch is turned off or an AC cord plug comes off. The voltage comparison result output section 47 ceases the operation detection function after detection of activation of the PFC 3 by the voltage comparison section 46 when the power switch is turned on, i.e., cancels operation sensing by the voltage comparison section 46. Note that the power switch is arranged on a power line between the AC power supply 1 and the full-wave rectifier circuit 2.

(1) When the power switch is turned on, the Zener diode ZD1 senses an input voltage of the DC-DC converter 4. When the input voltage of the DC-DC converter 4 becomes not lower than a fixed value, a + input of the comparator CP1 becomes H level, and an output of the comparator CP1 switches to H level.

(2) As a result, the transistor Tr1 is turned on, and the transistor Tr2 is turned off. A switching pulse from the DC-DC section control IC 43 is supplied to the FET 42 for switching to start switching operation of the FET 42.

(3) The output of the comparator CP1 is also fed back to the + input end of the comparator via the diode D1. With the wiring, once the output of the comparator CP1 becomes H level, the output maintains the state unless there is no supply of power to the comparator CP1.

With the above-described operations, even after operation of the PFC 3 is stopped after turning off of the power switch or coming off of the AC cord plug, the DC-DC converter 4 can continue to operate by utilizing electric charge (a voltage) accumulated in the output capacitor 35 of the PFC 3. As a result, the function of maintaining a power output for the fixed time period after turning off of the power switch or coming off of the AC cord plug can be achieved.

Note that after a power input is completely stopped, e.g., after turning off of the power switch or coming off of the AC cord plug, i.e., after operation of the PFC 3 is stopped, the DC-DC converter in a subsequent stage operates only on a smoothed voltage charged in the output capacitor 35 of the PFC 3. Accordingly, a power factor of the power output that is maintained for the fixed time period is not degraded.

Figure 2:
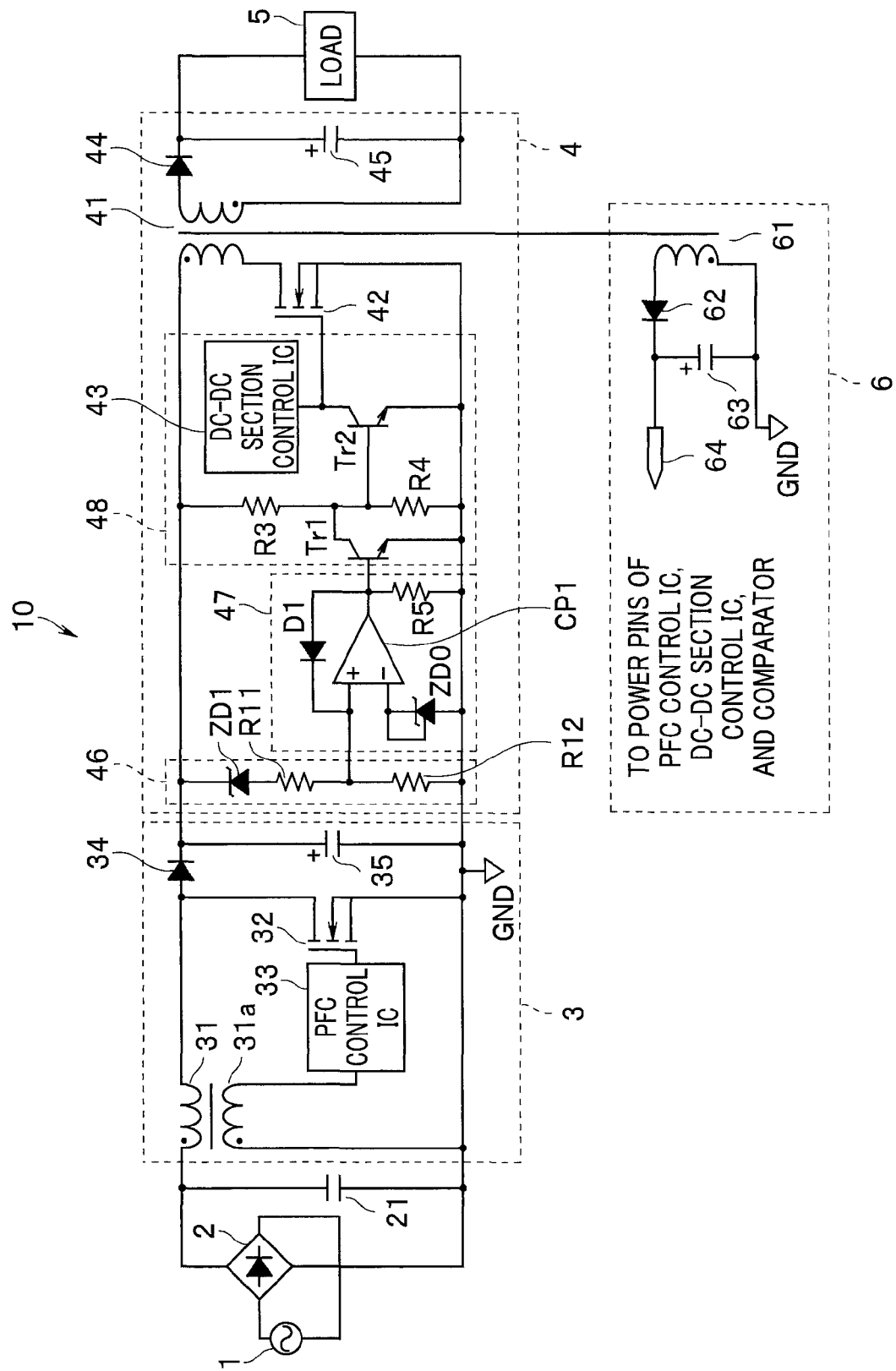
FIG. 2 is a circuit diagram showing a configuration obtained by adding an auxiliary winding to the configuration in FIG. 1.

FIG. 2 shows a configuration obtained by adding an auxiliary winding to FIG. 1.

FIG. 2 is obtained by expressly writing an internal power supply 6 which uses an auxiliary winding 61 which is formed concentric with the transformer 41 for switching in the circuit diagram in FIG. 1.

The internal power supply 6 includes the auxiliary winding 61 and a rectifier circuit which is connected in parallel to the auxiliary winding 61 and is composed of a diode 62 for rectification and a capacitor 63 for smoothing. The internal power supply 6 generates circuit power required for individual circuit sections of the PFC 3 and DC-DC converter 4 and outputs the circuit power through an output terminal 64 which is connected to a connection point of the diode 62 and the capacitor 63. More specifically, the internal power supply 6 has a function of supplying a DC voltage of about 15 V to the PFC control IC 33, the DC-DC section control IC 43, and the comparator CP1.

In the configuration in FIG. 1, when the AC power supply is switched on, if an output voltage (hereinafter referred to as a PFC output voltage) charged in the output capacitor 35 of the PFC 3 exceeds the predetermined reference voltage (e.g., 390 V) of the voltage comparison section 46, the Zener diode ZD1 is turned on. As a result, the output of the comparator CP1 becomes H level, and the H level state is maintained by the diode D1 for feedback. That is, even if the PFC output voltage declines gradually to drop below the predetermined reference voltage due to turning off of the power switch (not shown) or coming off of the AC cord plug, the H level state maintained by the latch function of the voltage comparison result output section 47 is maintained for a certain time period. However, if the PFC output voltage declines further to not higher than, e.g., 100 to 80 V, an output voltage of the internal power supply 6 including the auxiliary winding 61 declines to near 0 V. With the decline, power required for the internal circuits of the PFC 3 and DC-DC converter 4 is no longer supplied. At the time point, operation of the power supply device 10 is completely stopped.

Accordingly, when the power switch is turned off or the AC cord plug comes off, an output-maintained time period from the time point of the power supply device 10 depends on a time period to discharge the PFC output voltage, i.e., electric charge accumulated in the output capacitor 35. That is, the output-maintained time period can be set by adjusting capacity of the output capacitor 35 of the PFC 3.

Figure 3:
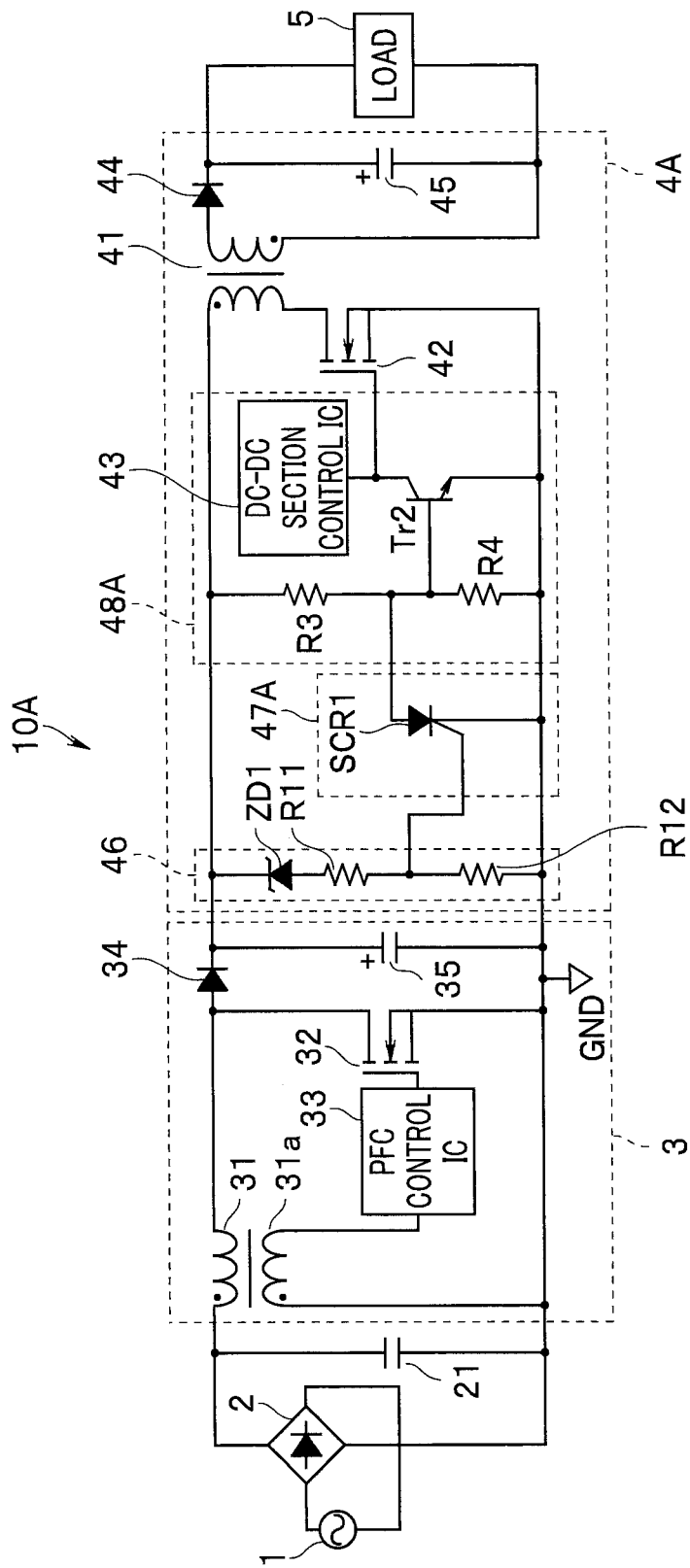
FIG. 3 is a circuit diagram showing a different example of a voltage comparison result output section in the power supply device according to the first embodiment.

FIG. 3 shows a different example of the voltage comparison result output section and the converter control section in the power supply device in FIG. 1.

A power supply device 10A shown in FIG. 3 includes a voltage comparison result output section 47A and a converter control section 48A which are different from the voltage comparison result output section and the converter control section in the power supply device 10 in FIG. 1. Other components are same as in FIG. 1.

Referring to FIG. 3, the voltage comparison result output section 47A is a circuit which uses a thyristor SCR1.

The voltage comparison result output section 47A is configured such that a gate of the thyristor SCR1 is connected to a connection point of the resistors R11 and R12 in the voltage comparison section 46, a cathode of the thyristor SCR1 is connected to the ground GND, and an anode of the thyristor SCR1 is connected to a connection point of the resistors R3 and R4.

The converter control section 48A includes a series circuit made up of the resistors R3 and R4 which is connected in parallel to the output capacitor 35 in the PFC 3. The converter control section 48A is configured such that an anode of the thyristor SCR1 is connected to the connection point of the resistors R3 and R4, a base of the transistor Tr2 is connected to the connection point of the resistors R3 and R4, an emitter of the transistor Tr2 is connected to the ground GND, a collector of the transistor Tr2 is connected to an output point of the DC-DC section control IC 43, and the collector is connected to a gate of the FET 42 for switching.

The thyristor SCR1 is an element in which conduction between an anode and a cathode is provided (the element is turned on) when a gate of the thyristor SCR1 becomes H level, and the on state is kept until a current between the anode and the cathode becomes 0.

Operation will be described hereinafter.

When a PFC output voltage exceeds a predetermined reference voltage of the Zener diode ZD1 in the voltage comparison section 46 after a power switch is turned on, the Zener diode ZD1 is turned on, a potential at the connection point of the resistors R11 and R12, i.e., a gate potential of the thyristor SCR1 becomes H level, the thyristor SCR1 is turned on, the transistor Tr2 is turned off, and switching operation of a DC-DC converter 4A is started.

When the PFC output voltage starts to decline and drops below the predetermined reference voltage after the power switch is turned off, the Zener diode ZD1 is turned off, and the gate potential of the thyristor SCR1 becomes 0. However, the thyristor SCR1 maintains the on state, the transistor Tr2 maintains the off state, and an output of the DC-DC converter 4A is maintained.

When the PFC output voltage declines further, and a potential at the connection point of the resistors R3 and R4 of the converter control section 48A becomes near 0, the current between the anode and the cathode of the thyristor SCR1 becomes 0, power is no longer supplied to the DC-DC section control IC 43, and the switching operation of the DC-DC converter 4A is stopped.

Figure 4:
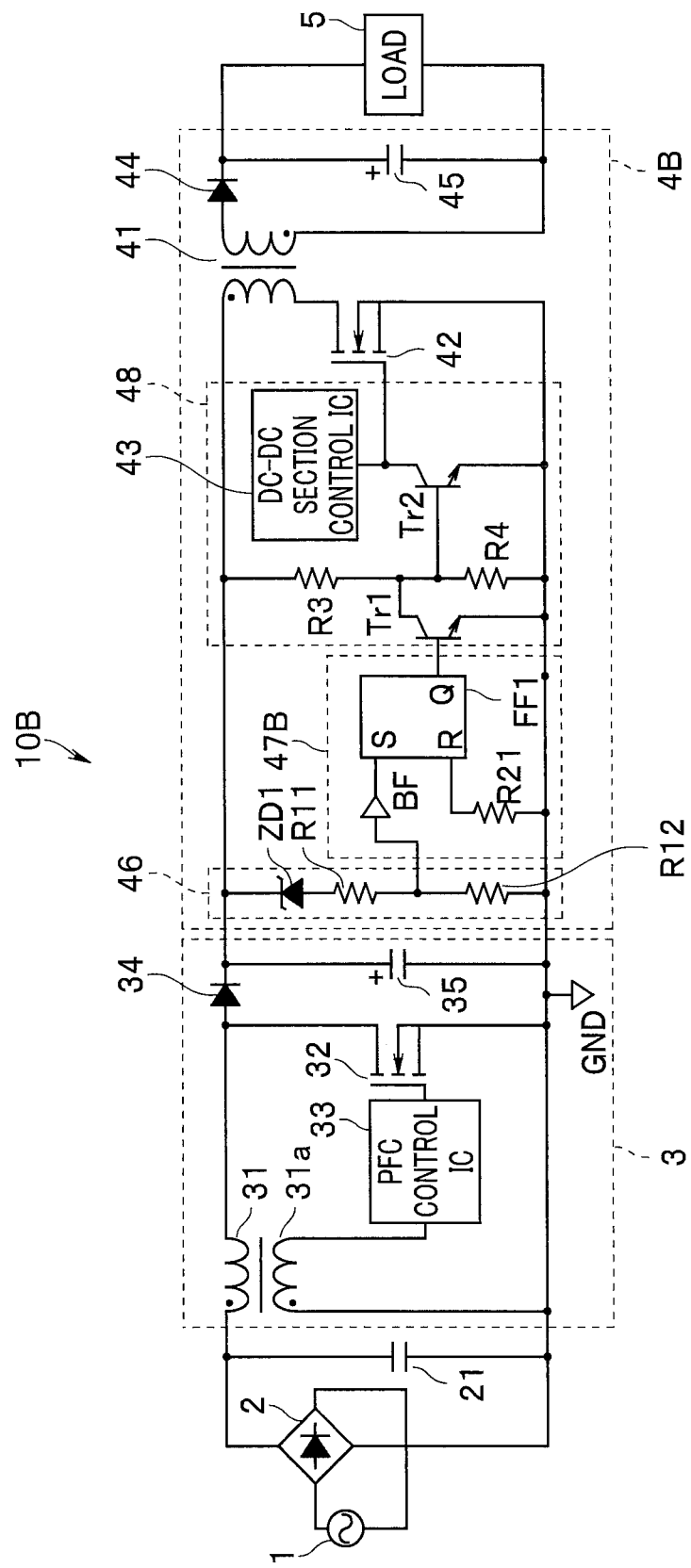
FIG. 4 is a circuit diagram showing another different example of the voltage comparison result output section in the power supply device according to the first embodiment.

FIG. 4 shows another different example of the voltage comparison result output section in the power supply device in FIG. 1.

A power supply device 10B shown in FIG. 4 includes a voltage comparison result output section 47B which is different from the voltage comparison result output section of the power supply device 10 in FIG. 1. Other components are same as in FIG. 1.

Referring to FIG. 4, the voltage comparison result output section 47B is a circuit which uses an RS flip-flop FF1.

The voltage comparison result output section 47B is configured such that a connection point of the resistor R11 and the resistor R12 in the voltage comparison section 46 is connected to a set input end S of the RS flip-flop FF1 via a buffer amplifier BF, a reset input end R of the RS flip-flop FF1 is connected to the ground GND via a resistor R21, and an output end Q of the RS flip-flop FF1 is connected to a base of the transistor Tr1 in the converter control section 48. Note that the converter control section 48 is configured in a same manner as in FIG. 1.

Since an R input is fixed at L level in the RS flip-flop FF1, when an S input becomes H level, an output Q becomes H level. Since the R input is fixed at L level, the output Q is maintained at H level until a power supply voltage of the internal power supply 6 (not shown) (see FIG. 2) becomes 0, i.e., power is no longer supplied to the RS flip-flop FF1.

Operation will be described hereinafter.

When a PFC output voltage exceeds a predetermined reference voltage of the Zener diode ZD1 in the voltage comparison section 46 after a power switch is turned on, the Zener diode ZD1 is turned on, the S input of the RS flip-flop FF1 becomes H level, and the output Q also becomes H level. As a result, the transistor Tr1 is turned on, the transistor Tr2 is turned off, and switching operation of a DC-DC converter 4B is started.

When the PFC output voltage starts to decline and drops below the predetermined reference voltage after the power switch is turned off, the Zener diode ZD1 is turned off. Since the R input is fixed at L level, the output Q of the RS flip-flop FF1 maintains the H level state, the transistor Tr1 maintains the on state, the transistor Tr2 maintains the off state, and an output of the DC-DC converter 4B is maintained.

When the PFC output voltage declines further, and power is no longer supplied to the RS flip-flop FF1, the switching operation of the DC-DC converter 4B is stopped.

The first embodiment allows a function of sensing activation of a PFC and activating a DC-DC converter in a stage subsequent to the PFC when a power input is turned on and maintaining a power output for a fixed time period when a power switch is turned off or an AC cord plug comes off.

It is thus possible to realize a two-converter type power supply device used in an instrument for medical purposes or the like which can retain a required power output for a fixed time period after a power input is stopped.

Second Embodiment

Figure 5:
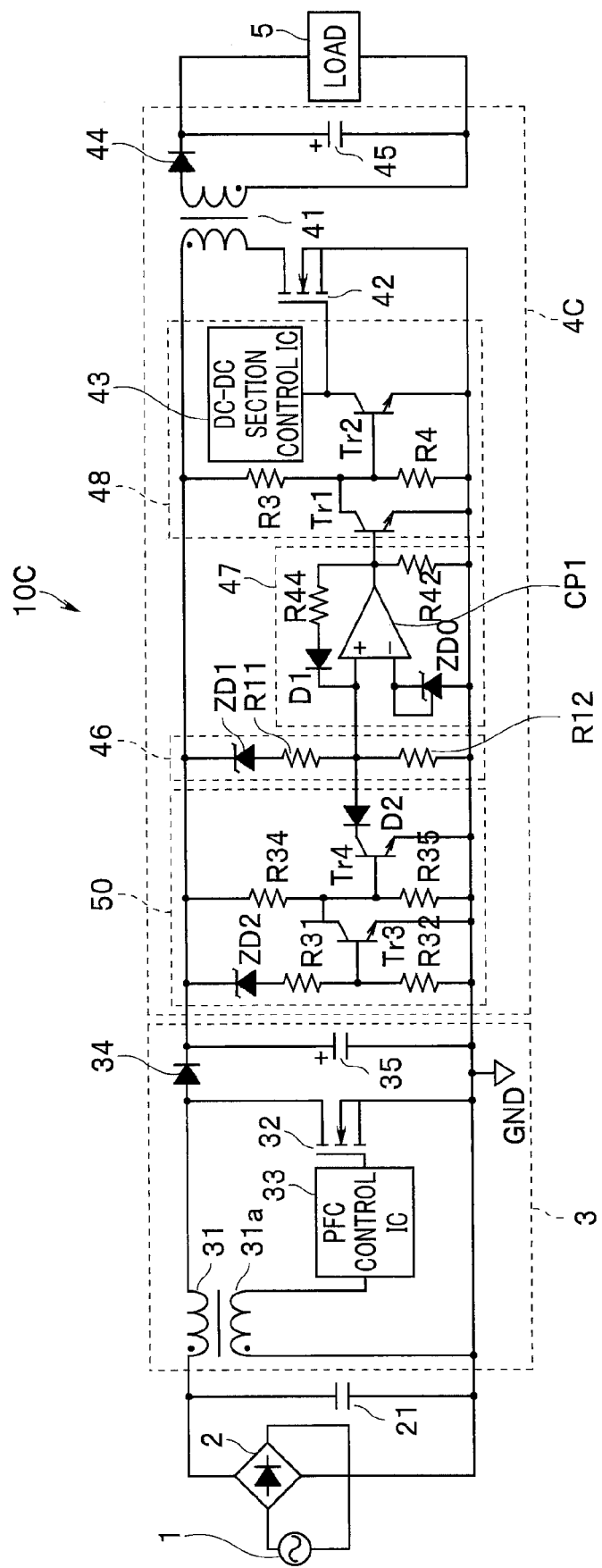
FIG. 5 is a circuit diagram showing a configuration of a power supply device according to a second embodiment of the present invention.

FIG. 5 shows a configuration of a power supply device according to a second embodiment of the present invention.

A power supply device 10C shown in FIG. 5 has a configuration obtained by adding another voltage comparison section 50 that is different from the voltage comparison section 46 to the DC-DC converter 4 in the power supply device 10 in FIG. 1. Other components are same as in FIG. 1.

In the different voltage comparison section 50, a series circuit made up of a Zener diode ZD2 and resistors R31 and R32 is connected in parallel to an output capacitor 35 of a PFC 3, and a series circuit made up of resistors R34 and R35 is connected in parallel to the output capacitor 35 of the PFC 3. The voltage comparison section 50 is configured such that a base of a transistor Tr3 is connected to a connection point of the resistors R31 and R32, an emitter of the transistor Tr3 is connected to a ground GND, a collector of the transistor Tr3 is connected to a connection point of the resistors R34 and R35, a base of a transistor Tr4 is connected to the connection point of the resistors R34 and R35, an emitter of the transistor Tr4 is connected to the ground GND, a collector of the transistor Tr4 is connected to a cathode of a diode D2, and an anode of the diode D2 is connected to a connection point of resistors R11 and R12 in a voltage comparison section 46 described above. Note that operating voltages of a Zener diode ZD1 and the Zener diode ZD2 are set such that, when Zener voltages of the Zener diodes ZD1 and ZD2 are denoted by ZD1 and ZD2, ZD1>ZD2 holds.

In the first embodiment shown in FIGS. 1 to 4, the Zener diode ZD1 prescribes only when to turn on the DC-DC converter 4, 4A, or 4B when the power switch is turned on. In contrast, in the second embodiment shown in FIG. 5, when to turn off a DC-DC converter 4C when a power switch is turned off is also prescribed using the Zener diode ZD2.

Operation will be described hereinafter.

An operation when the power switch is turned on is same as in the first embodiment. However, since the operating voltages (=the Zener voltages) of the two Zener diodes ZD1 and ZD2 satisfy the relationship ZD1>ZD2, in a process in which a PFC output voltage in a previous stage climbs after the power switch is turned on, the PFC output voltage reaches the Zener voltage ZD2 (e.g., 200 V) before exceeding the Zener voltage ZD1. For the reason, in the process in which the PFC output voltage climbs, the Zener diode ZD2 of the new different voltage comparison section 50 is turned on. On the basis of the on state of the Zener diode ZD2, the transistor Tr3 is turned on, the transistor Tr4 is turned off, and the diode D2 is brought out of conduction (turned off). Thus, the newly added different voltage comparison section 50 is also disconnected from circuit sections in a subsequent stage. As a result, the new different voltage comparison section 50 does not affect the voltage comparison section 46 and subsequent circuit sections.

When the power switch is turned on, the PFC output voltage climbs to above the Zener voltage ZD2. After the PFC output voltage climbs to above the Zener voltage ZD1 (e.g., 390 V), the Zener diode ZD1 is turned on, and an operation totally same as the operation in FIG. 1 is performed.

A flow of an operation when the power switch is turned off will be shown below.

(1) When the power switch is turned off or an AC cord plug comes off, the PFC output voltage lowers gradually through discharging. When the PFC output voltage lowers below a predetermined reference voltage (e.g., 200 V) of the Zener diode ZD2, the Zener diode ZD2 is turned off (i.e., lowering of an input voltage of the DC-DC converter is sensed). (When the PFC output voltage declines below a predetermined reference voltage based on the Zener diode ZD1 in the voltage comparison section 46, sensing operation by the Zener diode ZD1 is canceled by a latch function of a comparator CP1, as described in the first embodiment.)

(2) When the input voltage of the DC-DC converter 4C becomes not higher than a fixed value, the transistor Tr3 is turned off, and the transistor Tr4 is turned on.

(3) As a result, the diode D2 is brought into conduction (turned on), and a + input of the comparator CP1 is made L level via the diode D2.

(4) An output of the comparator CP1 becomes L level, the transistor Tr1 is turned off, the transistor Tr2 is turned on, and switching operation of an FET 42 of the DC-DC converter 4C is stopped.

As can be seen from the above-described operations, when to deactivate the DC-DC converter 4C can be controlled by appropriately selecting (prescribing) the operating voltage of the Zener diode ZD2. The mechanism allows arbitrary setting of an output-maintained time period after the power switch is turned off or the AC cord plug comes off.

Lowering of the PFC output voltage due to a failure of the PFC in a previous stage can also be sensed by prescribing, for example, 390 V for on operation of a switching power supply and prescribing, for example, 200 V for off operation of the switching power supply. It is also possible to prevent the PFC from continuing to operate with poor-quality power factor improving operation.

Figure 6:
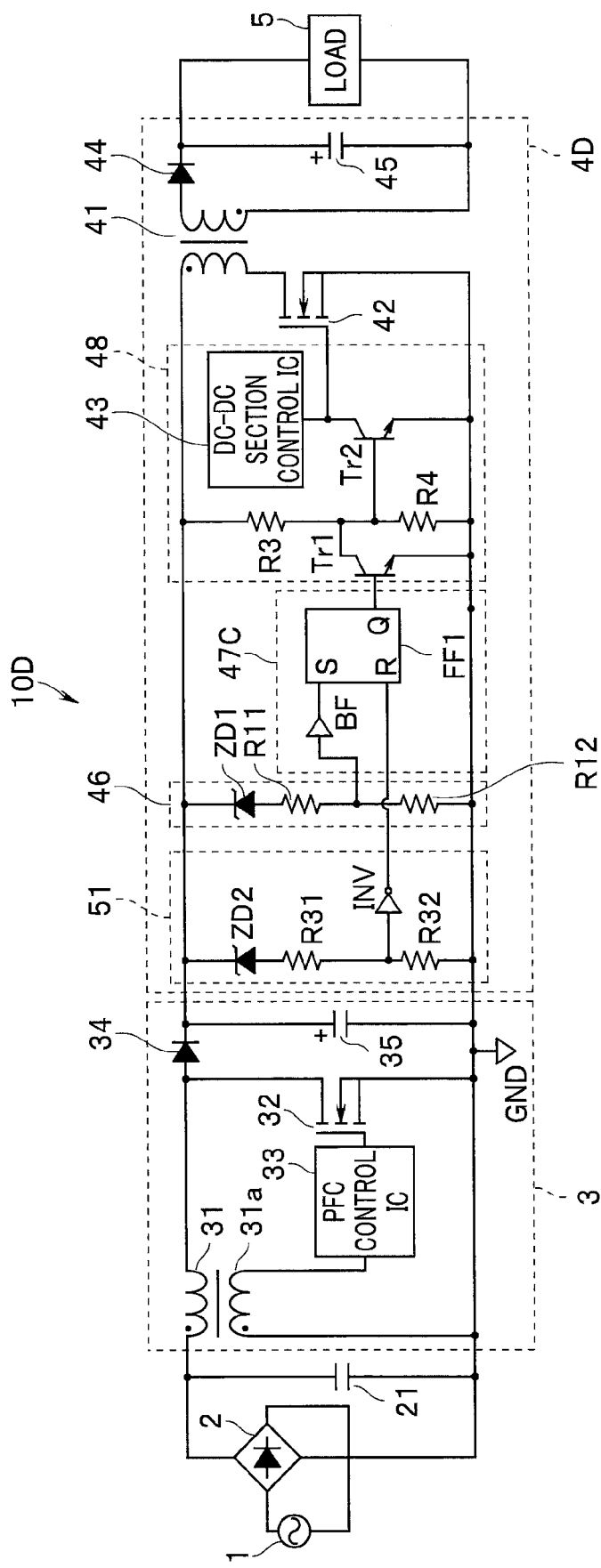
FIG. 6 is a circuit diagram showing a different example of a DC-DC converter in the power supply device according to the second embodiment.

FIG. 6 shows a different example of the DC-DC converter in the power supply device according to the second embodiment.

A power supply device 10D shown in FIG. 6 has a schematic configuration obtained by adding another voltage comparison section 51 that is different from the voltage comparison section 46 to the DC-DC converter 4B in the power supply device 10B in FIG. 4. Wiring of a voltage comparison result output section 47C is thus slightly different from the wiring in FIG. 4. Other components are same as in FIG. 4.

The different voltage comparison section 51 is configured such that a series circuit made up of the Zener diode ZD2 and the resistors R31 and R32 is connected in parallel to the output capacitor 35 of the PFC 3, and a connection point of the resistors R31 and R32 is connected to the reset input end R of the RS flip-flop FF1 of the voltage comparison result output section 47C via an inverter (inverting circuit) INV. Note that operating voltages of the Zener diodes ZD1 and ZD2 are set such that, when Zener voltages of the Zener diodes ZD1 and ZD2 are denoted by ZD1 and ZD2, ZD1>ZD2 holds.

In the configuration shown in FIG. 6, when a PFC output voltage reaches a certain voltage after a power input is switched on, the Zener diode ZD1 is turned on. When the S input of the RS flip-flop FF1 becomes H level, the output Q also becomes H level. The transistor Tr1 is turned on, the transistor Tr2 is turned off, and switching operation of a DC-DC converter 4D is started.

When the power input is shut off, and the PFC output voltage lowers to a certain voltage, the Zener diode ZD2 is turned off, and the R input becomes H level. At the time, since ZD1>ZD2 holds, the S input is already at L level, the output Q is at L level, the transistor Tr1 is turned off, the transistor Tr2 is turned on, and the switching operation of the DC-DC converter 4D is stopped.

In the configuration in FIG. 6 as well, a same operation as for FIG. 5 can be achieved.

That is, when to deactivate the DC-DC converter 4D can be controlled by appropriately selecting (prescribing) the operating voltage of the Zener diode ZD2. The mechanism allows arbitrary setting of an output-maintained time period after a power switch is turned off or an AC cord plug comes off.

The second embodiment has a mechanism for, when a power switch is turned off, controlling operation of a DC-DC converter with a reference voltage different from a reference voltage used when the power switch is turned on. Thus, the mechanism can realize a function of maintaining an output for a predetermined arbitrary time period.

While several embodiments of the present invention have been described, the embodiments are presented by way of example only. Various omissions, substitutions, and changes can be made without departing from spirit of the invention. The embodiments and modifications of the embodiments are included within scope and spirit of the present invention.

What is claimed is:
1. A power supply device comprising:
a first converter which converts an inputted voltage to a first voltage and outputs the first voltage;
a second converter which converts the first voltage outputted from the first converter to a second voltage and outputs the second voltage;
a voltage comparison section which compares the first voltage outputted from the first converter with a predetermined reference voltage;
a voltage comparison result output section which outputs a first signal until the first voltage is determined to be higher than the predetermined reference voltage by the voltage comparison section and retains a second signal as an output after the first voltage is determined to be higher than the predetermined reference voltage; and a converter control section which controls the second converter to stop when the first signal is outputted from the voltage comparison result output section and controls the second converter to operate when the second signal is outputted from the voltage comparison result output section, wherein the power supply device further comprises a different voltage comparison section which compares the first voltage with a different reference voltage which is lower than the predetermined reference voltage, and wherein the voltage comparison result output section outputs the first signal when the first voltage is determined to be lower than the different reference voltage by the different voltage comparison section while the second signal as the output is retained.

2. The power supply device according to claim 1, wherein the voltage comparison result output section is composed of a circuit including a comparator and a diode which feeds back an output of the comparator to one input end of the comparator, and an output from the voltage comparison section is inputted to the one input end, a voltage serving as a reference is inputted to the other input end, and a voltage comparison result is outputted from an output end of the comparator.

3. The power supply device according to claim 1, wherein the voltage comparison result output section is composed of a circuit which uses a thyristor, and an output from the voltage comparison section is inputted to a gate of the thyristor, a cathode is connected to a ground, and a voltage comparison result is outputted from an anode.

4. The power supply device according to claim 1, wherein the voltage comparison result output section is composed of a circuit which uses an RS flip-flop, and an output from the voltage comparison section is inputted as an S input, an R input is fixed at a ground level, and a voltage comparison result is outputted as a Q output.

5. The power supply device according to claim 1, wherein the voltage comparison result output section is composed of a circuit including a comparator and a diode which feeds back an output of the comparator to one input end of the comparator, an output from the voltage comparison section is inputted to the one input end, a voltage serving as a reference is inputted to the other input end, and a voltage comparison result is outputted from an output end of the comparator, and the different voltage comparison section outputs the second signal as an output of the different voltage comparison section to an output point of the voltage comparison section when an output of the first converter is higher than the different reference voltage and outputs the first signal as the output of the different voltage comparison section to the output point of the voltage comparison section when the output of the first converter is lower than the different reference voltage.

6. The power supply device according to claim 1, wherein the voltage comparison result output section is composed of a circuit which uses an RS flip-flop, and an output from the voltage comparison section is inputted as an S input, an output from the different voltage comparison section is inverted and inputted as an R input, and a voltage comparison result is outputted as a Q output.

* * * * *